(12) United States Patent
Montalban

(10) Patent No.: US 10,095,048 B2
(45) Date of Patent: Oct. 9, 2018

(54) NOSEPIECE FOR EYEGLASS FRAMES

(71) Applicant: VISOTTICA INDUSTRIE S.p.A., Susegana (IT)

(72) Inventor: Rinaldo Montalban, Venice (IT)

(73) Assignee: VISOTTICA INDUSTRIE S.P.A., Susegana (IT)

( * ) Notice: Subject to any disclaimer, the term of this patent is extended or adjusted under 35 U.S.C. 154(b) by 0 days.

(21) Appl. No.: 14/714,353

(22) Filed: May 18, 2015

(65) Prior Publication Data

US 2015/0331252 A1  Nov. 19, 2015

(30) Foreign Application Priority Data

May 19, 2014  (IT) .............................. PD2014A0126

(51) Int. Cl.
*G02C 5/12*  (2006.01)

(52) U.S. Cl.
CPC ............. *G02C 5/122* (2013.01); *G02C 5/126* (2013.01); *G02C 5/128* (2013.01)

(58) Field of Classification Search
CPC .......... G02C 5/12; G02C 5/122; G02C 5/126; G02C 5/128
USPC ... 351/136, 137, 138, 41, 103, 88, 131, 132, 351/78, 65, 69, 141
See application file for complete search history.

(56) References Cited

U.S. PATENT DOCUMENTS

| | | | |
|---|---|---|---|
| 2,274,589 A | 2/1942 | Conneely | |
| 3,394,980 A * | 7/1968 | Dym ...................... | G02C 5/126 2/446 |
| 4,681,411 A | 7/1987 | Taddei | |
| 5,872,612 A * | 2/1999 | MacIntosh, Jr. ......... | G02C 5/12 351/136 |
| 7,559,646 B2 | 7/2009 | Kwan | |
| 7,591,555 B1 * | 9/2009 | Chen ....................... | G02C 5/122 351/106 |
| 2001/0055093 A1 * | 12/2001 | Saitoh .................... | G02C 5/124 351/136 |
| 2005/0200804 A1 * | 9/2005 | Kawabata ................ | G02C 5/12 351/70 |
| 2008/0068558 A1 * | 3/2008 | Pan ......................... | G02C 5/00 351/141 |

(Continued)

FOREIGN PATENT DOCUMENTS

| | | |
|---|---|---|
| DE | 1212314 | 3/1966 |
| DE | 3537217 | 4/1986 |

(Continued)

*Primary Examiner* — Ricky Mack
*Assistant Examiner* — Daniele Manikeu
(74) *Attorney, Agent, or Firm* — Mark M. Friedman

(57) ABSTRACT

Nosepiece for eyeglass frames, which comprises a plate, an appendage projecting from the plate and comprising a convex portion, and a cup which is fixed to the frame of eyeglasses, is provided with two opposite lateral walls joined together by a connection wall, and houses the appendage. A screw is provided, engaged in first through holes of the cup, having the shank placed to traverse a second through hole of the appendage, the latter being susceptible of rotating with respect to the cup around a first longitudinal axis with the surface of its convex portion in contact and in sliding-with-friction relation with the internal surface of the connection wall of the cup, in order to maintain the plate in the angular position reached around the first longitudinal axis.

17 Claims, 13 Drawing Sheets

(56) References Cited

U.S. PATENT DOCUMENTS

2009/0079933 A1* 3/2009 Kwan .................... G02C 5/122
                                                         351/137
2015/0160472 A1* 6/2015 Buffa ...................... G02C 1/02
                                                         351/136

FOREIGN PATENT DOCUMENTS

| | | |
|---|---|---|
| DE | 8815489 U | 4/1990 |
| DE | 29923177 U | 5/2000 |
| EP | 0171461 | 2/1986 |
| EP | 1469337 | 10/2004 |
| EP | 2028526 | 2/2009 |
| FR | 2820835 | 8/2002 |
| FR | 2988181 | 9/2013 |
| GB | 2013360 | 8/1979 |
| WO | 2010057883 | 5/2010 |
| WO | 2014/170477 A1 | 10/2014 |

* cited by examiner

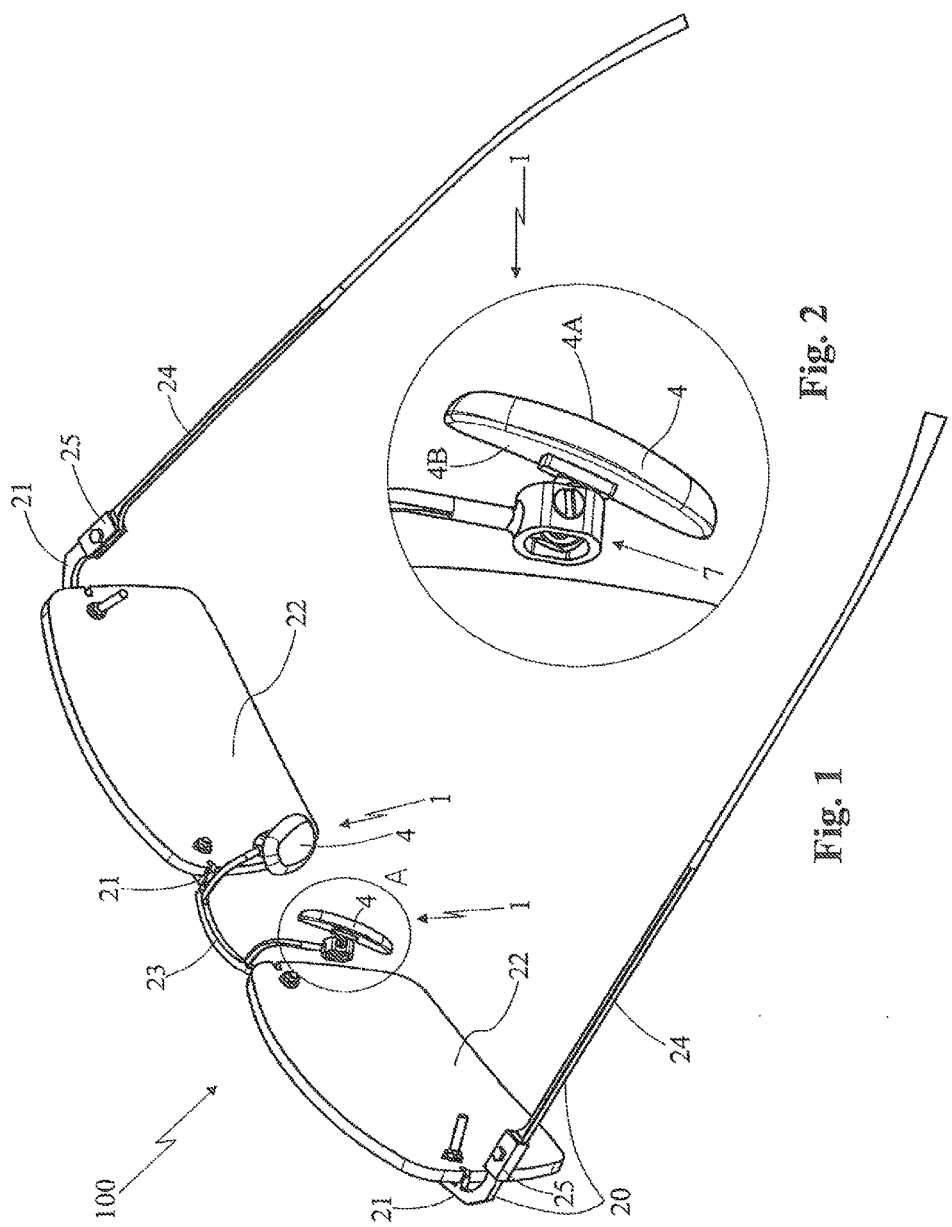

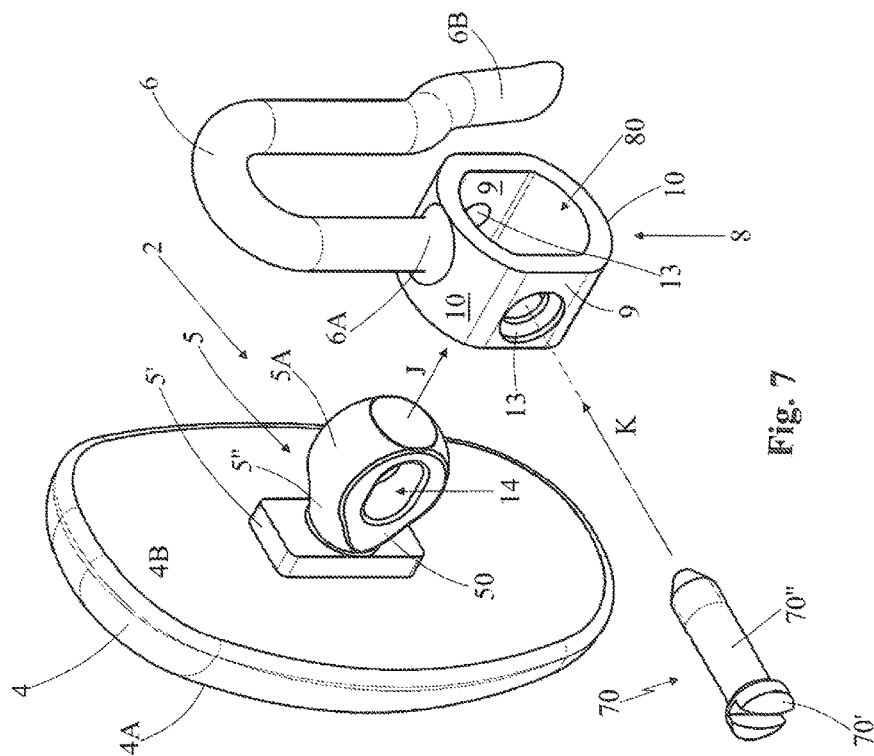
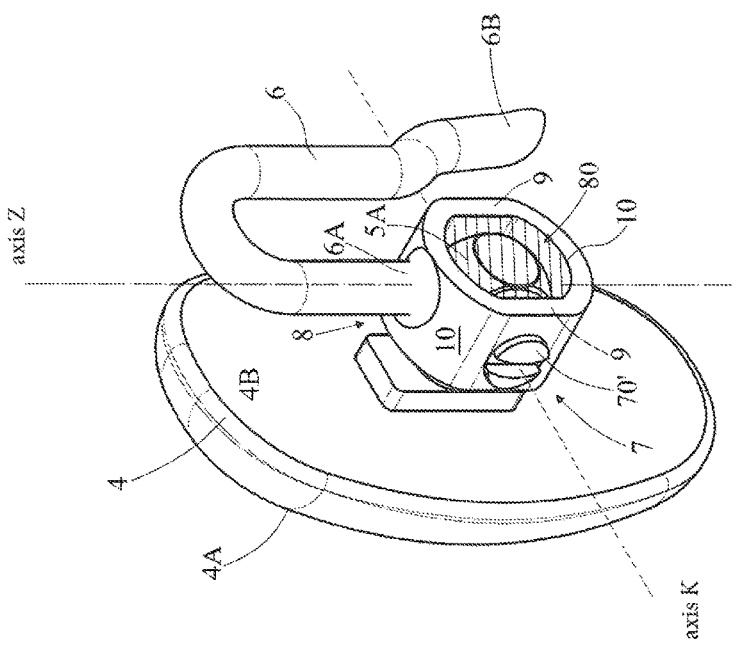

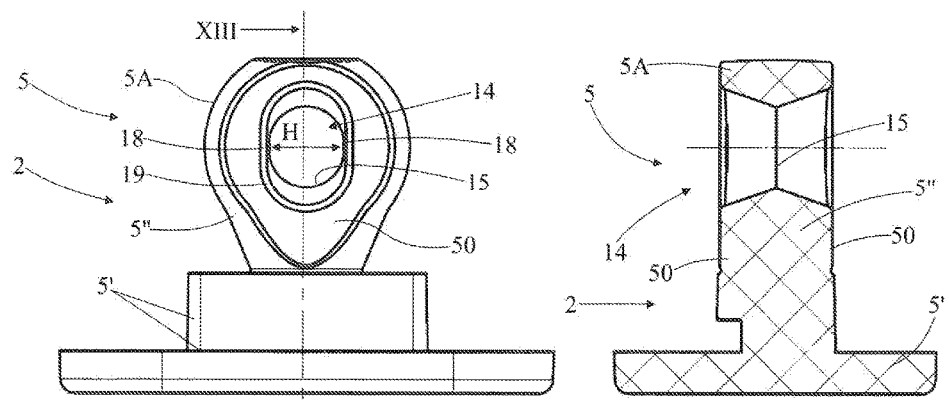
Fig. 12  Fig. 13
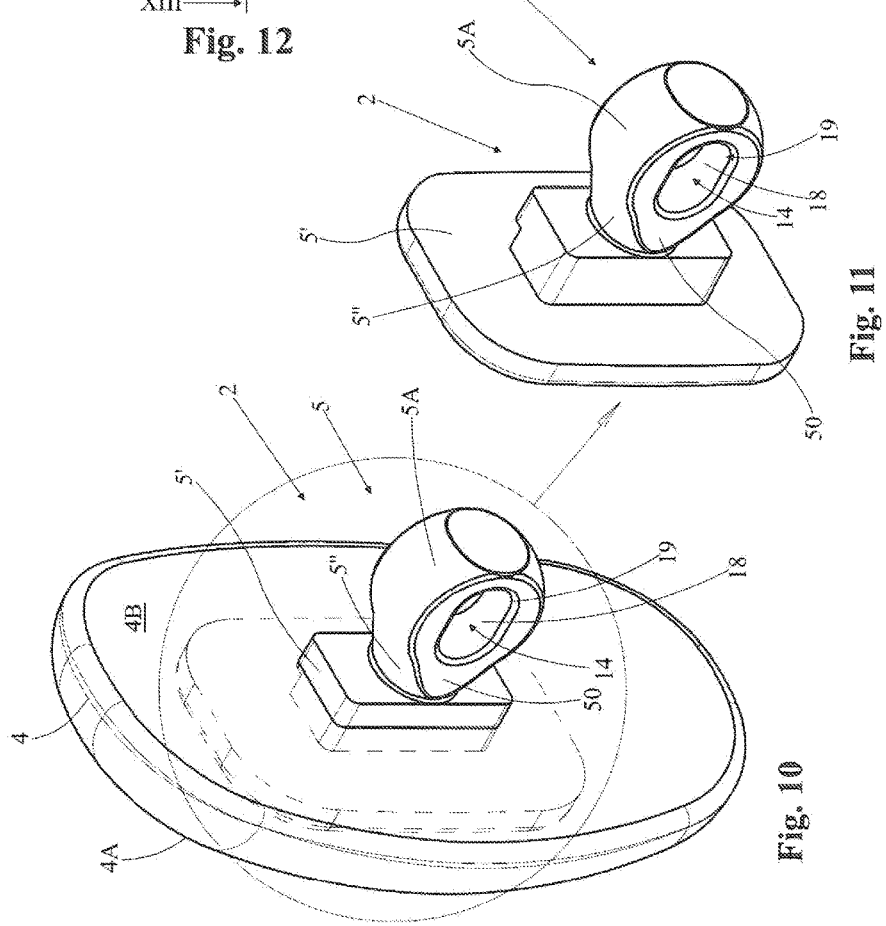
Fig. 11
Fig. 10

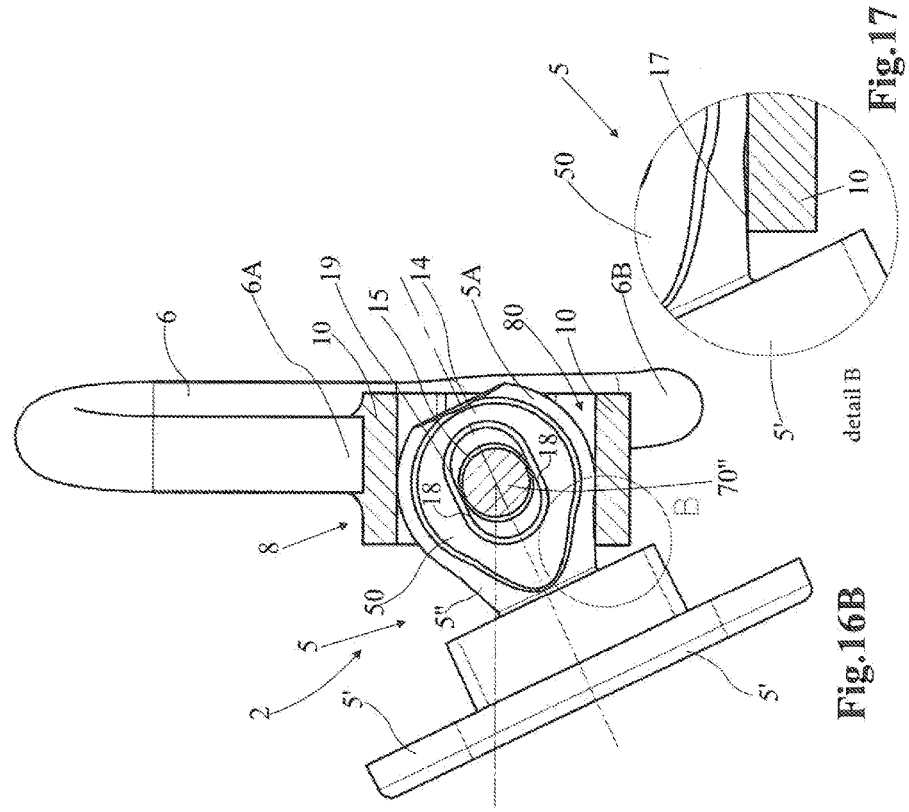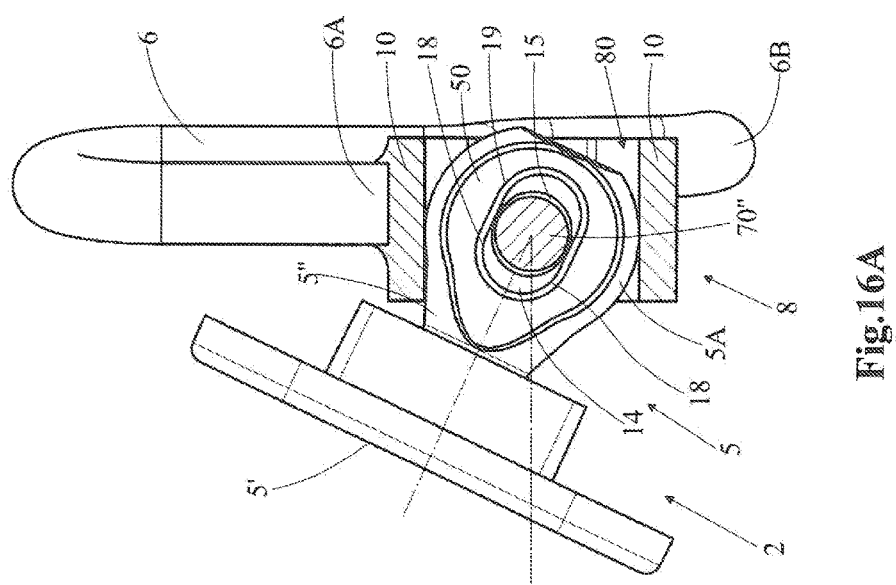

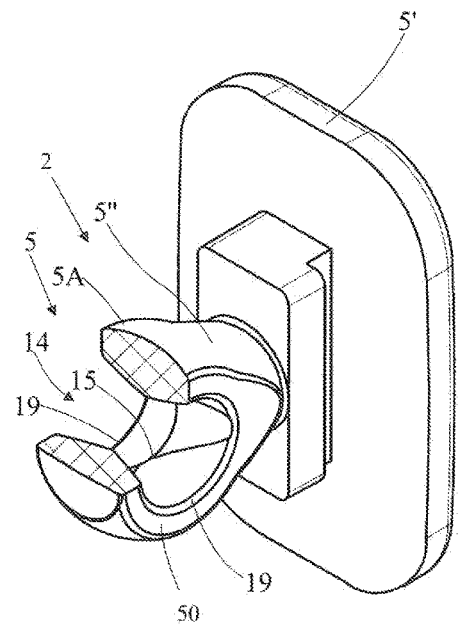 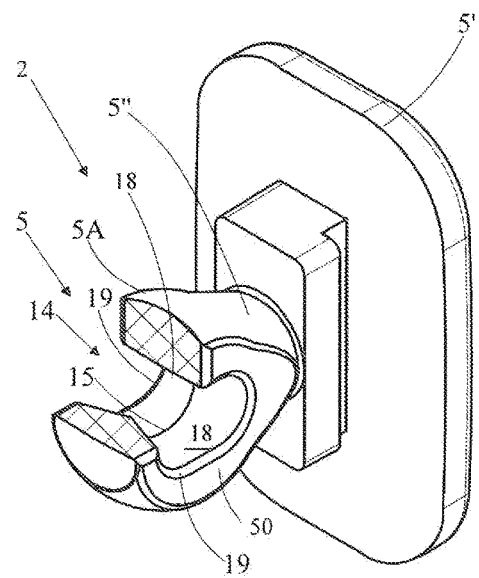
Fig. 26A Fig. 26B
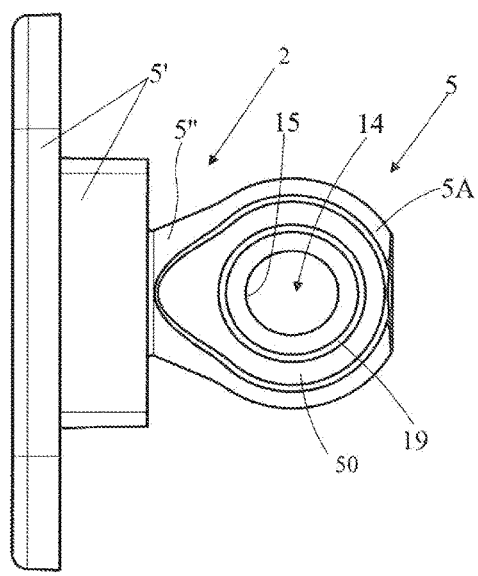 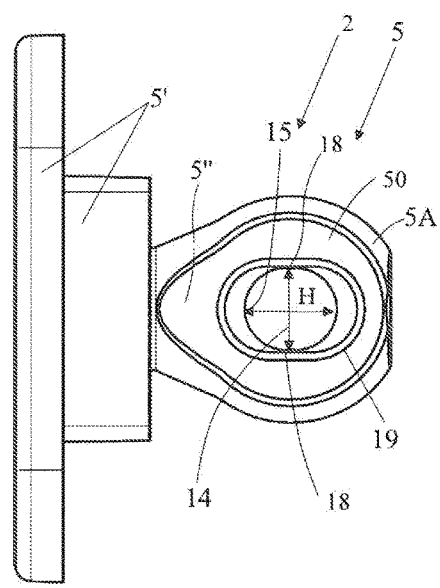
Fig. 27A Fig. 27B

NOSEPIECE FOR EYEGLASS FRAMES

FIELD OF APPLICATION

The present invention regards a nosepiece for eyeglass frames according to the preamble of the independent main claim.

The present nosepiece is advantageously intended to be employed in the production of frames for eyeglasses and in particular of metal frames, in order to determine, together with a second nosepiece of a provided pair of nosepieces, a correct ergonomic position for abutting the frames against the nose of the user and hence for correctly centering the lenses with respect to the eyes, ensuring an optimal vision.

Therefore, the nosepiece, subject of the present invention, is inserted in the industrial field of eyeglasses, i.e. of the production of eyeglasses and accessories and components for eyeglasses.

State of the Art

Conventionally, in the eyeglasses field, nosepieces are integrated in the frame in order to support the eyeglasses on the nose of the user with maximum comfort.

In accordance with one of the most widespread embodiments on the market, each nosepiece consists of a plate, provided with a front face, intended to abut against the nose of a user, and with a rear face from which an appendage is projectingly extended that is adapted to be connected by means of mechanical retention means to a first end of a support arm, in turn fixed at its second end to the frame.

Usually the plate is made of soft plastic material (such as PVC or silicone), at whose interior an insert made of harder material is partially embedded (also made of plastic material, e.g. polycarbonate, or made of metal), which forms the projecting appendage intended to be joined with the support arm.

Generally, the mechanical retention means of the nosepieces of known type comprise a hollow element fixed at the first end of the support arm, which houses the free end of the plate appendage in a retention relationship.

The latter is retained in the hollow element due to retention means obtained with retention portions projecting from the hollow element, or, more often, by retention means constituted by a screw which is inserted in a transverse hole of the hollow element and is engaged with the plate appendage.

The nosepieces with screw retention means of conventional type, if on one hand they have the advantage of attaining an attachment type that is simple, strong and which allows an easy and quick substitution of the plate in case of need or wear, on the other hand they have the limit of a poor position adjustment of the plates for an optimal adaptation thereof to the form of the nose.

As is known, one of the requirements for user comfort is that the eyeglasses correctly fit on the face, and that therefore among other things the nosepieces have good mobility in order to be adapted to the various shapes of the user's nose.

This mobility depends mainly on a good connection between the plate and the support arm ensured by the retention means. Usually the screw retention means have the drawback of ensuring a small mobility and presenting the plate which "rocks" in an undesired manner on the support arm of the frame of the eyeglasses.

In order to overcome these drawbacks, nosepieces were obtained with retention means for the plates of ball/socket type, which increase the possibilities of adaptation of the nosepiece to the shape of the user's nose.

Examples of nosepieces of this type are described in the following patents: U.S. Pat. Nos. 4,681,411; 2,274,589; 7,559,646; GB 2013360; WO 2010057883; DE 8815489U and EP 171461.

The nosepieces of known type described in these patents do not entirely lack drawbacks, given that the retention means of ball/socket type described up to now do not allow a simple and quick mounting and dismantling of the plate.

Therefore, the retention means of ball/socket type have only improved the possibilities of adjustment of the plates with respect to the retention means of screw type, but they have worsened the ease of substitution of the worn plates with new ones.

Generally, the retention means of ball/socket type comprise a ball and a corresponding ball seat joined together by means of form coupling obtained with elastic or plastic deformation of one of the two components (usually the hemispherical seat).

Consequently, with the limited sizes of these components, the retention means of ball/socket type (which in some of the known nosepiece solutions indicated above are made of plastic material) have a very high risk of breakage. The same components also form retention means that are extremely "personalized", in the sense that if it is necessary to substitute the plate with another new plate, they are not interchangeable with convention screw type plates, which are readily found on the market.

Another drawback of the nosepieces employing retention means of ball/socket type of known type lies in the lack—in most cases—of means for limiting the rotation of the plate, or even in the case of presence of the latter (such as in the case of the nosepiece described in the U.S. Pat. No. 4,681,411), they are in any case unsuitable and not strong.

Presentation of the Invention

In this situation, the problem underlying the present invention is to eliminate the drawbacks of the abovementioned prior art, by providing a nosepiece for eyeglass frames that is simple and inexpensive to attain.

A further object of the present finding is to provide a nosepiece for eyeglass frames that can be easily attained in automatic production processes of eyeglasses.

A further object of the present finding is to provide a nosepiece for eyeglass frames that allows a quick and easy substitution of the plate abutting against the nose with another new plate, whether this is the same or of standardized type with screw retention means that can be easily found on the market.

A further object of the present finding is to provide a nosepiece for eyeglass frames that has high mechanical strength and offers high plate retention guarantee.

A further object of the present finding is to provide a nosepiece for eyeglass frames that allows adjusting the position of the plate with greater tilt angles than the nosepieces with screw retention means of conventional type.

A further object of the present finding is to provide a nosepiece for eyeglass frames which has means for limiting the rotation of the plate that are precise and strong.

A further object of the present finding is to provide a nosepiece for eyeglass frames that allows keeping/saving the position assumed by the plates even after the eyeglasses are taken off.

A further object of the present finding is to provide a nosepiece for eyeglass frames that is considerably compact.

These objects and still others are all attained by the nosepiece for eyeglass frames, subject of the present invention, which comprises a plate provided with a front face, intended to abut against the nose of a user, and with a rear face, an appendage, which is projectingly extended from the rear face of the plate and mechanical retention means adapted to fix the appendage to the frame of eyeglasses.

According to the idea underlying the present invention, the nosepiece for eyeglass frames is characterized in that the mechanical retention means comprise at least one cup fixed to the eyeglass frame according to a longitudinal extension axis, provided with at least two opposite lateral walls, joined together by at least one connection wall and with two aligned first through holes extended along a second transverse axis, substantially orthogonal to the first longitudinal axis; the appendage comprising a convex portion delimited by at least two faces with a second through hole aligned with the first through holes along the second transverse axis; the second through hole being tapered starting from the faces towards the interior up to a narrowing thereof that is substantially median; the appendage being at least partially housed within the cup with the faces facing the lateral walls of the cup and being susceptible of rotating with respect to the cup around the second transverse axis with the surface of its convex portion in contact and in sliding-with-friction relation with the internal surface of the at least one connection wall, in order to maintain the plate in the angular position reached around the second transverse axis; and at least one screw engaged in the first through holes of the cup and having the shank placed to traverse the second through hole of the appendage, the latter being susceptible of rotating with respect to the cup around the first longitudinal axis with the surface of its convex portion in contact and in sliding-with-friction relation with the internal surface of the at least one connection wall, in order to maintain the plate in the angular position reached around the first longitudinal axis.

BRIEF DESCRIPTION OF THE DRAWINGS

The technical characteristics of the finding, according to the aforesaid objects, can be clearly found in the contents of the below-reported claims and the advantages thereof will be clearer from the following detailed description, made with reference to the enclosed drawings, which represent several merely exemplifying and non-limiting embodiments of the invention, in which:

FIG. 1 shows a frame for eyeglasses with nosepieces mounted thereon according to the present invention;

FIG. 2 shows an enlarged detail of the frame for eyeglasses of FIG. 1 relative to one of the two nosepieces according to the present invention;

FIG. 6 shows a rear perspective view of the nosepiece according to the invention;

FIG. 7 shows a rear perspective view of the nosepiece according to the invention with its components illustrated in exploded view;

FIG. 10 shows an enlarged detail of the nosepiece according to the invention in a rear perspective view, relative to a plate for abutting against the nose and to an insert fixed thereto;

FIG. 11 shows an enlarged detail of FIG. 10 relative to the insert of the plate;

FIG. 12 shows a side view of the detail of FIG. 11;

FIG. 13 shows a sectional top view of the detail of FIG. 12 carried out along the line XIII-XIII of the same FIG. 12;

FIGS. 16A and 16B show the nosepiece according to the invention in two different adjustment positions, rotated with respect to each other with respect to a transverse axis K;

FIG. 17 shows an enlarged detail of the FIG. 16B relative to the end stop of the rotation towards the bottom of the plate;

FIGS. 26A and 26B show the inserts of the respective FIGS. 27A and 27B with an appendage projection in sectional view carried out along two planes that are 90-degree orthogonal;

FIGS. 27A and 27B compare the inserts of the embodiments of nosepieces, respectively of FIGS. 23 and 2 in side view.

DETAILED DESCRIPTION OF A PREFERRED EMBODIMENT

Figures 3, 4:
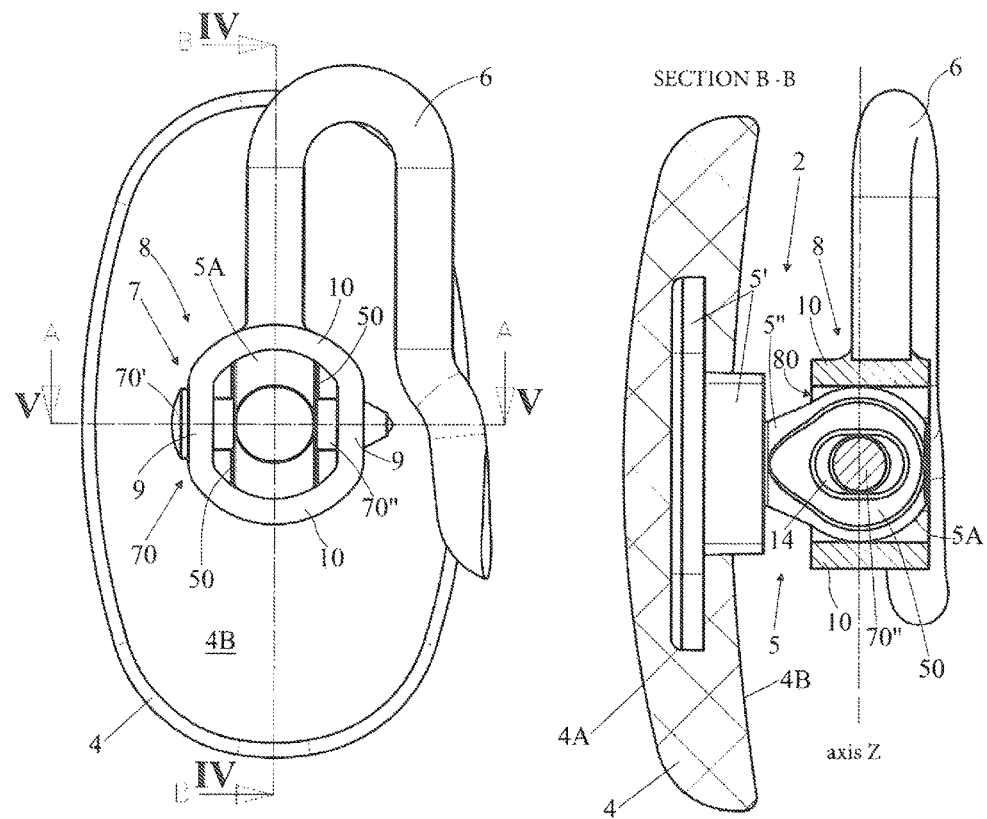
FIG. 3 shows a rear view of the nosepiece according to the invention.
FIG. 4 shows a longitudinal section view of the nosepiece of FIG. 3 carried out along the line IV-IV of the same FIG. 3.
Figure 5:
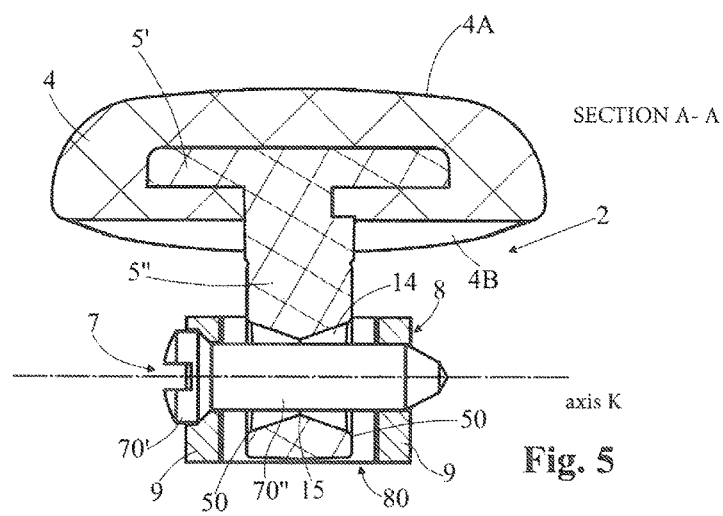
FIG. 5 shows a cross section view of the nosepiece of FIG. 3 carried out along the line V-V of the same FIG. 3.
Figure 8:
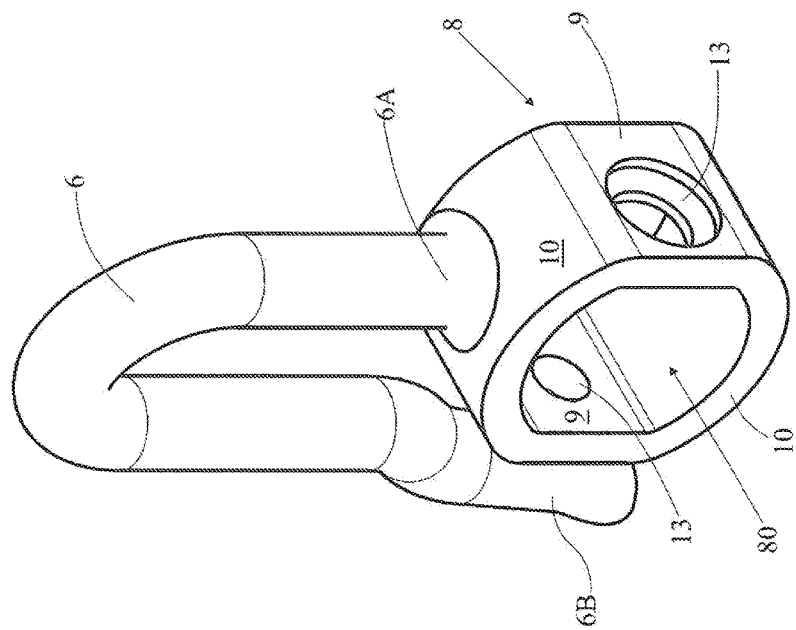
FIG. 8 shows an enlarged detail of the nosepiece according to the invention in a front perspective view, relative to a support arm and to a cup fixed thereto.
Figure 9:
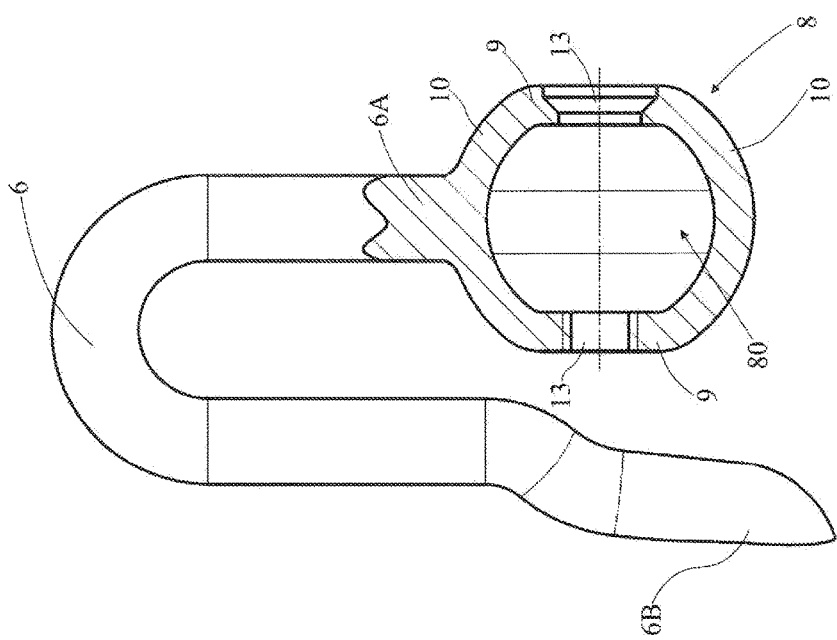
FIG. 9 shows a partial sectional front view of the detail of FIG. 8.
Figure 14A:
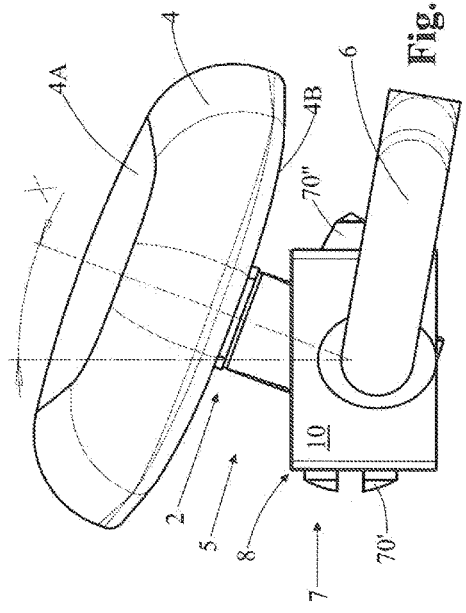
FIGS. 14A and 14B show the nosepiece according to the invention in two different adjustment positions, rotated with respect to each other with respect to a longitudinal axis Z.
Figure 14B:
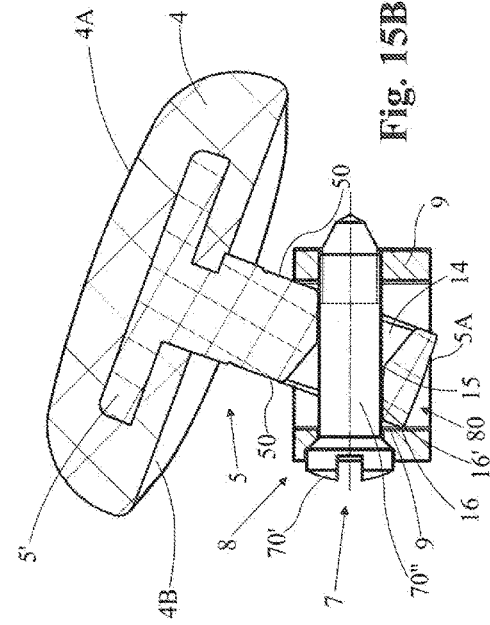

With reference to the set of drawings, reference number 1 overall indicates a nosepiece for eyeglass frames, subject of the present invention.

The nosepiece 1, according to the present invention, is intended to contribute to the attainment of frames 20 for eyeglasses 100 of both conventional and sports type, and is adapted to be abutted, in a per se known manner, against the nose of a user in order to correctly support the lenses with respect to the eyes.

The frame 20 will only be briefly described hereinbelow, given that its structural principles are well known to the man skilled in the art.

More in detail, the frame 20 is usually formed, in a per se entirely conventional manner, by a front 21, which supports a pair of lenses 22, connected in the central part by a bridge 23, and by a pair of arms 24 pivoted by means of hinges 25 placed on the sides of the front and, more precisely, at two lateral portions thereof directed towards the rear part of the eyeglasses and known in the technical jargon of the field with the term end pieces.

The nosepiece 1 according to the invention can be fixed both to a plastic and metal frame 20; nevertheless, it was advantageously mainly designed for a use with metal frames 20.

The nosepiece 1, subject of the present invention, comprises in a per se conventional manner a plate 4, provided with a front face 4A, intended to abut against the nose of a user, and with a rear face 4B. The plate 4 has a substantially flattened form such that its two faces are substantially parallel. The plate 4 is preferably made of a soft plastic material, such as PVC or silicone and is intended to come into direct contact with the nose of the user, obtaining a seal against the sliding of the eyeglasses and simultaneously ensuring a high degree of comfort for the user.

The nosepiece 1 then comprises an appendage 5, made of harder plastic material than that of the plate 4, for example polycarbonate or peek, which is projectingly extended from the rear face 4B of the plate 4 substantially along a main extension axis J orthogonal to the plane of the same plate 4, aimed to orient the latter substantially in the direction of the user's nose once the eyeglasses 100 are put on.

The appendage 5 is fixed to the rear face 4B of the plate 4 and preferably is part of an insert 2 which is provided with a support portion 5' advantageously embedded in the softer plastic material of the plate 4 and with the aforesaid appendage 5 in a single body with the support portion 5'.

The support portion 5' is a flat body on which ornaments or logos can be obtained, which are then visible through plate 4 if this is made of transparent material.

Mechanical retention means 7 are then provided which are adapted to fix the appendage 5 to the frame 20 of the eyeglasses 100.

Preferably, the aforesaid mechanical retention means 7 comprise a support arm 6, also termed hook, mechanically connected at its first end 6A to the cup 8 and susceptible of being fixed at its second end 6B to the frame 20 of the eyeglasses 100.

Figure 20:
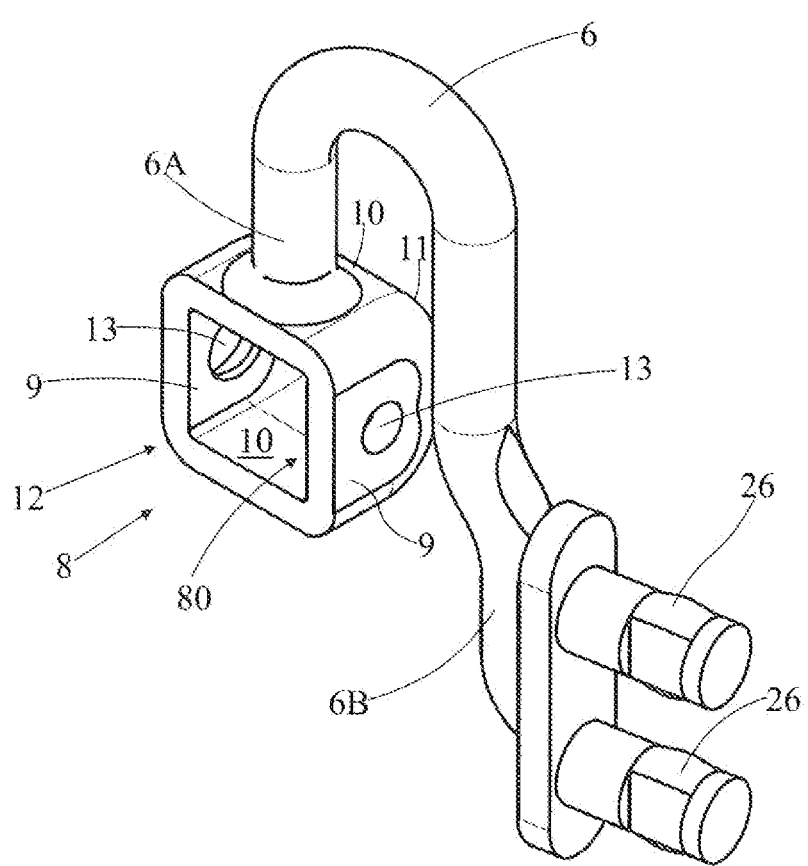
FIG. 20 shows a perspective view of the detail of the nosepiece according to the invention relative to the support arm and to the cup fixed thereto, intended for the fixing on a plastic frame in accordance with a second embodiment variant.

The fixing of the support arm 6 to the frame 20 of the eyeglasses 100 can be obtained for example by means of welding to the bridge 23 or to the rims of the front 21 of the frame 20, if the latter is made of metal, or by embedding the projecting portions 26 provided at the second end 6B of the arm in the plastic material matrix of the frame 20, if the latter is indeed made of plastic material (see FIG. 20).

The arm 6 is advantageously composed of a metal cylindrical wire, often provided with one or more bends for supporting the plate 4 on the nose starting from the frame 20.

According to the idea underlying the present invention, the mechanical retention means 7 of each nosepiece 1 comprise a cup 8, which is fixed as a prolongation of the support arm 6 at its first end 6A along a first longitudinal extension axis Z.

More in detail the cup 8 is provided with at least two flat opposite lateral walls 9, joined together by at least one connection wall 10.

Advantageously, the two lateral walls 9 are joined together at both ends by means of two connection walls 10 (of which one is substantially upper and one substantially lower) so as to form a ring delimiting an internal containment chamber 80. Such chamber 80 can also be further closed with a bottom wall 11 placed to connect the edge of the two lateral walls 9 and the two connection walls 10 so as to face an opening 12 for the insertion of the appendage 5.

The upper and lower connection walls 10 can have a flat progression or be advantageously shaped with concave form towards the interior of the containment chamber 80, in particular a cylindrical cap form.

The two flat lateral walls 9 have two first through holes 13, which are aligned with each other along a second transverse extension axis K substantially orthogonal to the first longitudinal axis Z and advantageously substantially horizontal.

According to the invention the appendage 5 comprises a convex portion 5A, which is delimited on two lateral flanks by at least two flat faces 50, preferably parallel to each other. The latter have a second through hole 14 aligned with the first through holes 13 of the cup 8 along the second transverse axis K. Such second through hole 14 is tapered starting from the flat faces 50 towards the interior of the same second through hole 14 up to a narrowing 15 thereof that is substantially median with respect to the depth of the second through hole 14.

Advantageously in accordance with a preferred embodiment of the present invention illustrated in the enclosed figures, the convex portion 5A of the appendage 5 has spherical cap form.

The convex portion 5A of the appendage 5 is also preferably connected to the support portion 5' through a neck 5", in particular with frustoconical form, it too flattened at the two lateral flanks by the continuations of the two aforesaid flat faces 50 of the convex portion 5A.

The appendage 5 thus has dimensions such to be housed to size in the internal containment chamber 80 of the aforesaid cup 8, with its flat faces 50 arranged facing and advantageously also parallel to the lateral walls 9 of the cup 8.

The appendage 5, and hence also the plate 4 fixed thereto, is easily susceptible to being rotated in the internal containment chamber 80 of the cup 8, rotating with respect to the latter around the second transverse axis K with the surface of its convex portion 5A in contact and in sliding-with-friction relation with the internal surface of at least one connection wall 10 (and advantageously with the two upper and lower connection surfaces) in order to maintain the plate 4 in the angular position reached around the second transverse axis K, once it has been released in such position.

The mechanical retention means 7 also comprise a screw 70 provided with a head 70' and with a shank 70". The screw 7 is engaged in the first through holes 13 of the cup 8 and has the shank which traverses the second through hole 14 obtained in the appendage 5.

The shank 70" of the screw 70 has diameter smaller than or equal to that of the median narrowing 15 of the through hole 14.

The appendage 5, and hence also the plate 4 fixed thereto, is also susceptible of being rotated with respect to the cup 8 around the first longitudinal axis Z, with the surface of its convex portion 5A in contact and in sliding-with-friction relation with the internal surface of the connection wall 10 in order to maintain the plate 4 in the angular position reached around the first longitudinal axis Z, once it has been released in such position.

In this manner, each time that the eyeglasses 100 are removed, the nosepieces 1 remain in their correct orientation defined by the form of the user's nose, with regard to position adjustments that involved a rotation around the second transverse axis K and position adjustments that involved a rotation around the first longitudinal axis Z, as well as position adjustments that involved, as normally occurs, a combination of both of the aforesaid rotations.

The above-indicated two rotations thus allow making a multiplicity of intermediate adjustments. All these adjustments involve slight but constant friction, given the sizing with interference between the external surface of the convex portion 5A (in particular with spherical cap form) of the appendage 5 and the internal surface of the connection walls 10 of the cup 8, ensuring movements of the appendage without the unpleasant sensation of nosepieces of known type, that of excessive clearance of the plate 4 which therefore "rocks" in an undesired manner.

In accordance with a particular embodiment of the invention, the shank 70" of the screw 70 is in contact with the internal surface of the second through hole 14 at its median narrowing 15 and preferably has size such to be in contact with the entire circumference of the median narrowing 15. During the rotation of the appendage 5, and hence also of the plate 4 fixed thereto, with respect to the cup 8 around the first longitudinal axis Z, the internal surface of the second through hole 14 is in contact and in sliding-with-friction relation with the surface of the shank 70" of the screw 70, at least at the narrowing 15, in order to assist in maintaining the plate 4 in the angular position reached around the first longitudinal axis Z.

The second through hole 14 of the appendage 5 is provided with two internal surfaces 18 which are advantageously flat and parallel, substantially orthogonal to the first longitudinal axis Z and spaced from each other by a height H, substantially equal to or slighter greater than the diameter of the shank 70" of the screw 70 in order allow the latter to slide on such surfaces around the first longitudinal axis Z.

More clearly, the second through hole 14 is extended substantially along the aforesaid second transverse axis K starting from two elongated openings 19 placed on the flat faces 50 of the appendage 5, such openings 19 extended with the aforesaid two flat and parallel internal surfaces 18 along the main extension direction J of the appendage 5, mentioned above. Such flat and parallel 18 internal surfaces are progressively reduced towards the median narrowing 15, at which they terminate, due to the advantageously circular form of the same narrowing 15.

Figure 15A:
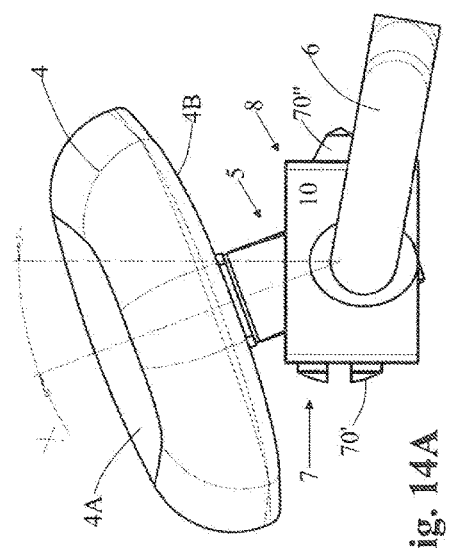
FIGS. 15A and 15B show the nosepiece according to the invention in the two different adjustment positions of FIGS. 14A and 14B along horizontal section planes.
Figure 15B:
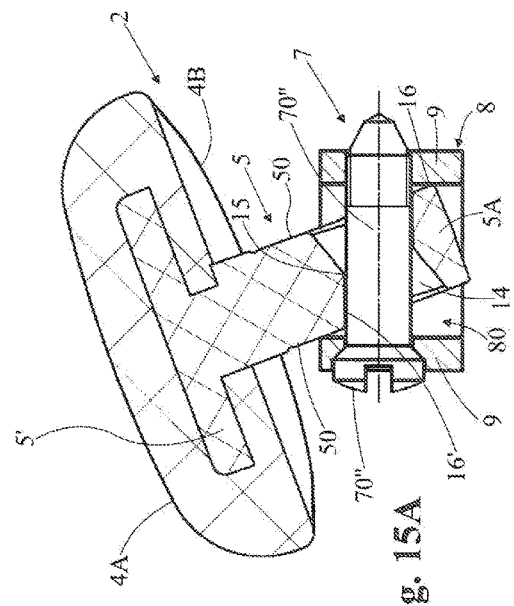
Figure 18:
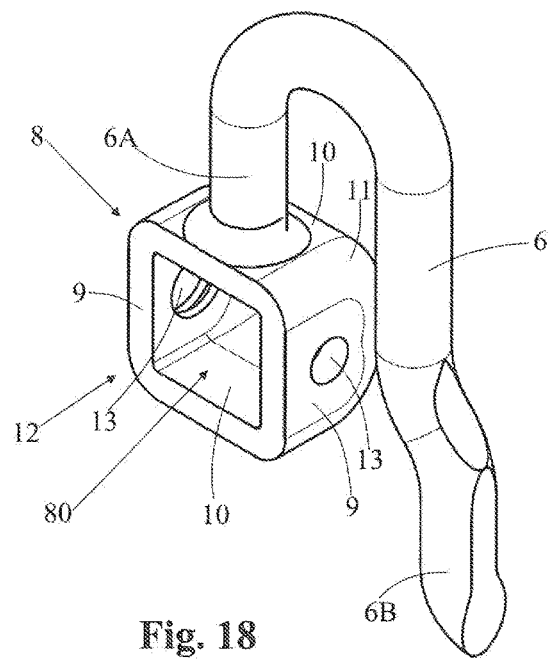
FIGS. 18 and 19 show the detail of the nosepiece according to the invention relative to the support arm and to the cup fixed thereto, according to two different perspective views and in accordance with a first embodiment variant.
Figure 19:
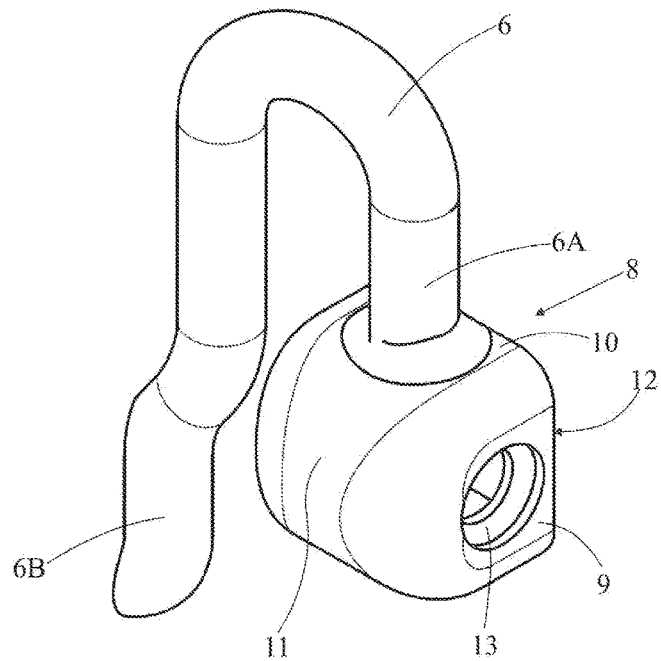

In accordance with an advantageous characteristic of the present invention, the flat faces 50 of the appendage 5 are spaced from the flat lateral walls 9 of the cup 8 and they are susceptible of impacting against the latter, defining first end stops 16 of the rotation of the appendage 5 around the aforesaid first longitudinal axis Z, as illustrated in FIGS. 15A and 15B.

Otherwise or jointly, the first end stops 16' for the rotation of the appendage 5 around the aforesaid first longitudinal axis Z can be obtained through the interference of the shank 70" of the screw 70 with the shaped internal surface of the second through hole 14, as illustrated in the same FIGS. 15A and 15B.

In turn, preferably, the neck 5" of the appendage 5 is susceptible of impacting against the connection walls 10 of the cup 8, defining second end stops 17 for the rotation around the second transverse axis K, as illustrated in FIG. 17.

The friction between the external surface of the convex portion 5A of the appendage 5 and the internal surface of the connection walls 10 of the cup 8 is given by the sizing with interference of the containment chamber 80 of the cup and the external height of the appendage 5.

Figure 22:
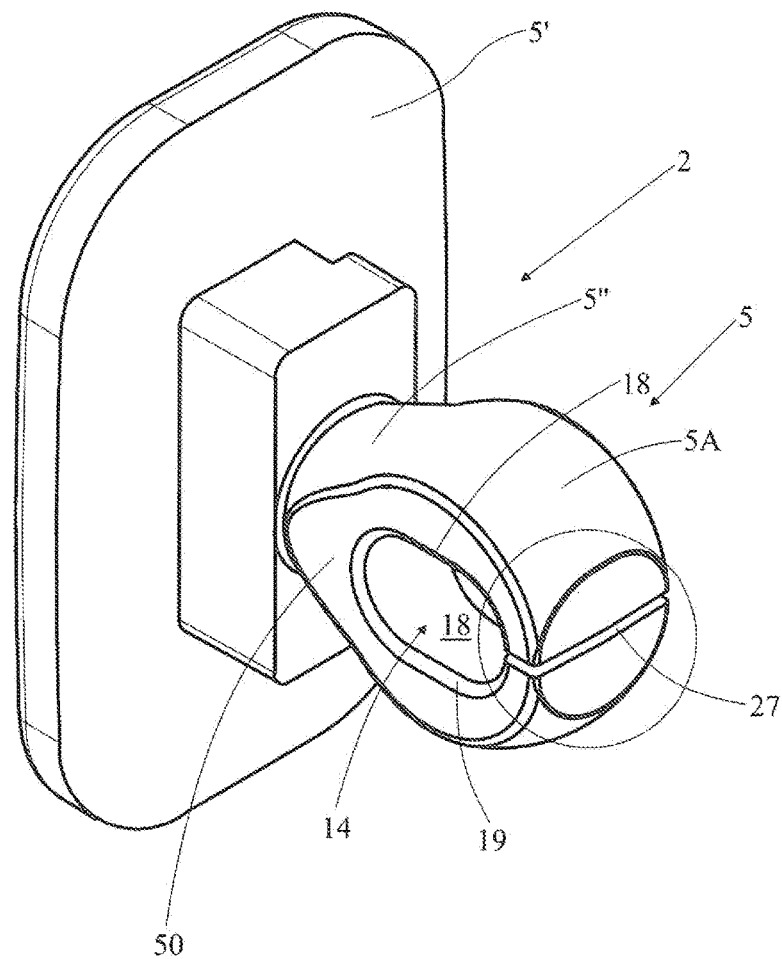
FIG. 22 shows a perspective view of the detail of the nosepiece according to the invention relative to the insert of the plate in accordance with a fourth embodiment variant.

Advantageously, in order to facilitate the attainment of the correct level of friction, it is possible to adjust the pressure exerted between the two surfaces in contact with the appendage 5 and the cup 8 and/or the appendage and with the screw 70. For such purpose, in accordance with the embodiment illustrated in FIG. 22, the convex portion 5A of the appendage 5 has a first notch 27, e.g. in median position along an axis parallel 15 to the second transverse axis K of its second through hole 14, susceptible of being enlarged or narrowed by means of deformation in order to respectively increase or decrease the elastic compression force of the external surface of the convex portion 5A of the appendage 5 on the internal surface of the connection walls 10 of the cup 8. Otherwise, in accordance with the particular embodiment mentioned above, the same adjustment can be used for adjusting the compression of the internal surface of the second through hole 14 against the external surface of the shank 70" of the screw 70.

Figure 21:
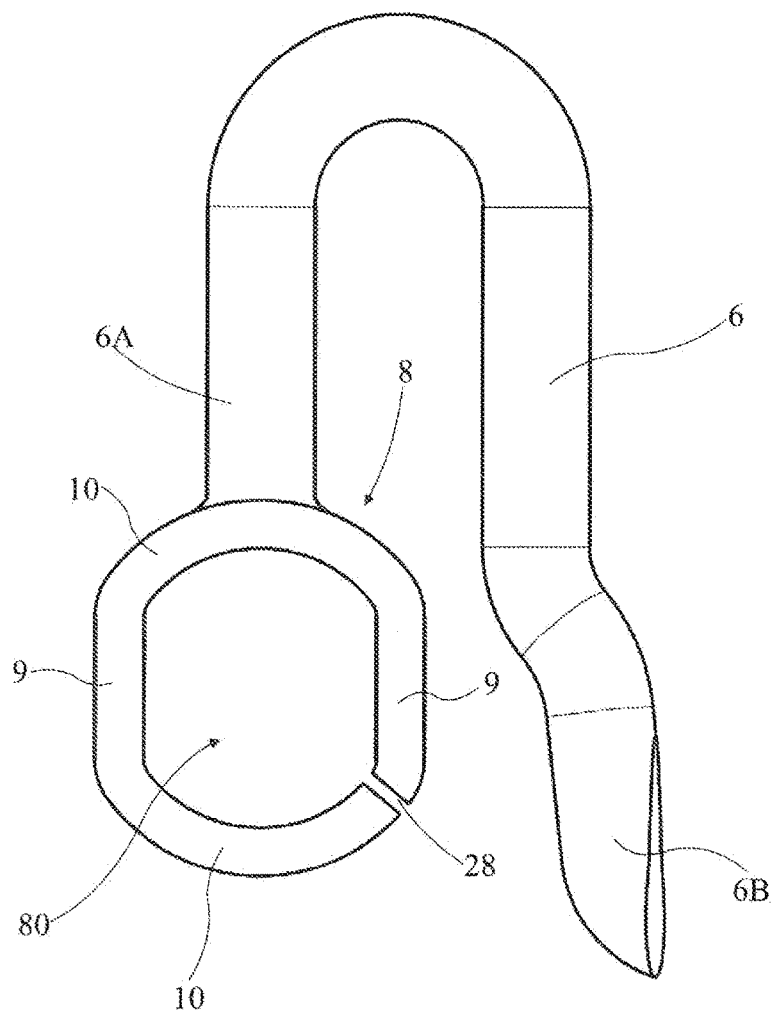
FIG. 21 shows a front view of the detail of the nosepiece according to the invention relative to the support arm and to the cup fixed thereto, intended for the fixing on a metal frame, in accordance with a third embodiment variant.

In accordance with a different embodiment illustrated in FIG. 21, a second notch 28 can be obtained (in addition to or in substitution of the first notch 27) placed to interrupt the annular extension of the cup 8 and susceptible of being enlarged or narrowed by means of deformation in order to respectively decrease or increase the elastic compression force of the internal surface of the connection walls 10 of the cup 8 against the external surface of the convex portion 5A of the appendage 5.

Figure 24:
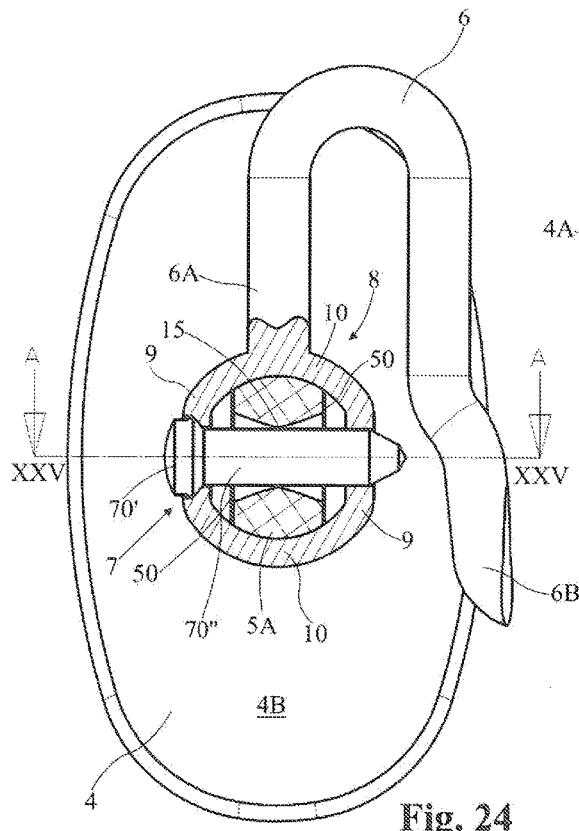
FIG. 24 shows a rear view of the nosepiece of FIG. 23 with some parts in section in order to better represent other parts.
Figure 23:
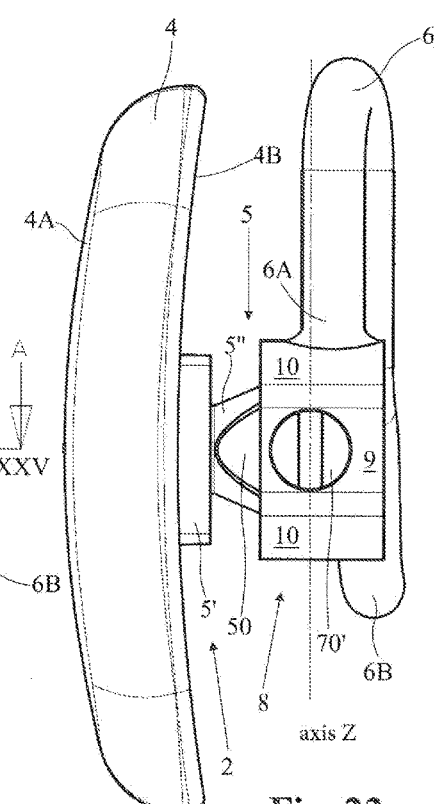
FIG. 23 shows a side view of a fifth embodiment variant of the nosepiece according to the invention.
Figure 25:
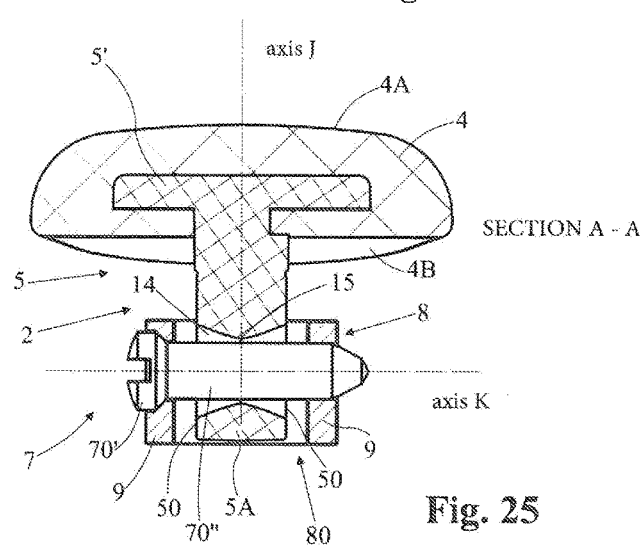
FIG. 25 shows a cross section view of the nosepiece of FIG. 23 carried out along the line XXV-XXV of the same FIG. 24.

In accordance with a further and particular embodiment of the present invention, the appendage 5, and thus the plate 4 fixed thereto, is provided with a further degree of freedom (see FIGS. 23, 24 and 25) i.e. rotation around the main extension axis J of the appendage 5 which, as indicated above, is substantially horizontal and is extended orthogonally to the plate 4. For such purpose, the second through hole 14 of the appendage 5 is tapered with two frustoconical cavities that converge starting from the flat faces 50 of the appendage 5 towards the narrowing 15. The latter assumes a nearly circular shape with diameter substantially equal to or slightly greater than that of the shank 70" of the screw 70 in order to allow the sliding of the convex portion 5A of the appendage 5 on the internal surface of the connection walls 10 of the cup 8 during the rotation of said appendage 5 with respect to the cup 8 around the main extension axis J of the same appendage 5.

The nosepiece thus conceived therefore attains the pre-established objects and in particular is capable of conferring considerable adjustment freedom to the plates 4 along at least two rotation axes, through a joint mechanism obtained with the appendage 5, the cup 8 and the screw 70 which substantially has the characteristics of ball joints, or the simplest and most inexpensive screw joints for nosepieces given that for example the support arm 6 and the screw 70 can be conventional components that are already on the market.

The nosepiece 1 according to the invention also has the advantage of having greater strength and mechanical retention guarantee for the plate 4 with respect to the conventional ball/socket mechanisms of known type, due to the presence of the screw 70 for fixing the plate 4.

A further advantage of the nosepiece 1 of known type lies in the interchangeability of the plate 4 according to the invention with the plates intended for the screw connection of the conventional nosepieces that are easy to find on the market, though losing the adjustment possibilities allowed by the nosepiece 1 according to the present invention.

A further advantage of the nosepiece 1 according to the invention lies in the greater extension of the rotation angles of the plate 4 with respect to the screw nosepiece solutions of known type.

A further advantage of the nosepiece 1 according to the invention lies in the presence of end stops for limiting the rotation 16, 16', 17 of the plate 4 that are more precise and stronger than those of the state of the art.

A further advantage of the nosepiece 1 according to the invention lies in the fact that once the adjustment of the position of the plates 4 is carried out, such position remains saved/in place even after the eyeglasses are taken off, due to the coupling via 15 interference present between the convex portion 5A of the appendage 5 and the internal surface of the cup 8.

The invention claimed is:

1. Nosepiece for eyeglass frames, which comprises:
   a plate provided with a front face, intended to abut against the nose of a user, and with a rear face;
   an appendage, which is projectingly extended from the rear face of said plate;
   mechanical retention means adapted to fix said appendage to the frame of eyeglasses;
   wherein said mechanical retention means comprise at least:
   a cup fixed to said frame of eyeglasses according to a first longitudinal extension axis (Z) provided with at least two opposite lateral walls, joined together by at least one connection wall and with two aligned first through holes extended along a second transverse axis (K), substantially orthogonal to said first longitudinal axis (Z); said appendage comprising a convex portion delimited by at least two opposite faces with a second through hole aligned with said first through holes along said second transverse axis (K); said second through hole being extended substantially along said second transverse axis (K) starting from two opposite openings placed on the faces of said appendage; said second through hole being tapered starting from said faces towards the interior up to a narrowing thereof that is substantially median with respect to the depth of said second through hole between said two faces; said appendage being at least partially housed within said cup with said faces facing the lateral walls of said cup and being susceptible of rotating with respect to said cup around said second transverse axis (K) with the surface of its convex portion in contact and in sliding-with-friction relation with the internal surface of said at least one connection wall in order to maintain said plate in the angular position reached around said second transverse axis (K);
   and at least one screw engaged in the first through holes of said cup and having a shank placed to traverse said second through hole of said appendage, the latter being susceptible of rotating with respect to said cup around said first longitudinal axis (Z) with the surface of its convex portion in contact and in sliding-with-friction relation with the internal surface of said at least one connection wall, in order to maintain said plate in the angular position reached around said first longitudinal axis (Z).

2. Nosepiece for eyeglass frames according to claim 1, wherein the lateral walls of said cup are flat and the faces of said appendage facing said lateral walls are flat.

3. Nosepiece for eyeglass frames according to claim 1, wherein said mechanical retention means comprise a support arm mechanically connected at a first end thereof to said cup and susceptible of being fixed at the second end thereof to the frame of said eyeglasses.

4. Nosepiece for eyeglass frames according to claim 3, wherein said first longitudinal extension axis (Z) is extended as a prolongation of said support arm starting from its first end.

5. Nosepiece for eyeglass frames according to claim 1, wherein said appendage is susceptible of rotating with respect to said cup around said first longitudinal axis (Z) with the surface of said narrowing at least partially in contact and in sliding-with-friction relation with the surface of the shank of said screw in order to collaborate to maintain said plate in the angular position reached around said first longitudinal axis (Z).

6. Nosepiece for eyeglass frames according to claim 2, wherein the flat faces of said appendage are spaced from the flat lateral walls said cup, against which they are susceptible of impacting, defining first end stops of said rotation around said first longitudinal axis (Z).

7. Nosepiece for eyeglass frames according to claim 2, wherein the interference of the shank of said screw with the shaped internal surface of said second through hole defines first end stops of the rotation of said appendage around said first longitudinal axis (Z).

8. Nosepiece for eyeglass frames according to claim 1, wherein the convex portion of said appendage is extended towards said plate by means of a neck susceptible of impacting against the at least one connection wall of said cup, defining at least one second end stop of said rotation around said second transverse axis (K).

9. Nosepiece for eyeglass frames according to claim 1, wherein the lateral walls of said cup are joined at the two opposite ends by an upper connection wall and by a lower connection wall on which the external surface of the convex portion of said appendage rotates with friction with respect to said first longitudinal axis (Z) and with respect to said second transverse axis (K).

10. Nosepiece for eyeglass frames according to claim 2, wherein the convex portion of said appendage has spherical cap form delimited by said flat faces, parallel to each other.

11. Nosepiece for eyeglass frames according to claim 1, wherein the second through hole of said appendage is provided with two flat and parallel internal surfaces substantially orthogonal to said first longitudinal axis (Z) and spaced from each other by a height (H) at least equal to the diameter of said screw, in order to slide in contact with such screw and in sliding-with-friction relation around said first longitudinal axis (Z).

12. Nosepiece for eyeglass frames according to claim 1, wherein said at least one connection wall of said cup has cap form, in particular cylindrical.

13. Nosepiece for eyeglass frames according to claim 1, wherein the convex portion of said appendage has a first notch, in particular in median position along an axis parallel to the second transverse axis (K) of said second through hole thereof, susceptible of conferring an adjustable elastic pressure force of the external surface of the convex portion of said appendage on the internal surface of the connection walls of said cup.

14. Nosepiece for eyeglass frames according to claim 2, wherein said cup has an annular extension defined by said flat lateral walls and by said connection walls; a second notch being provided to interrupt said annular extension and susceptible of conferring an adjustable elastic pressure force of the internal surface of said cup against the external surface of the convex portion of said appendage.

15. Nosepiece for eyeglass frames according to claim 9, wherein the flat lateral walls of said cup and the upper and lower connection walls are joined by a bottom wall opposite an opening for inserting said appendage.

16. Nosepiece for eyeglass frames according to claim 1, wherein the second through hole of said appendage is tapered with two frustoconical cavities that converge starting from the flat faces of said appendage towards said narrowing, which has a substantially circular form with diameter at least equal to that of the shank of said screw; said appendage being susceptible of rotating with respect to said cup around a further main extension axis (J) of said appendage, substantially orthogonal to said plate, with the surface of its convex portion in contact and in sliding-with-friction relation with the internal surface of said at least one connection wall in order to maintain said plate in the angular position reached around said main axis (Z).

17. Frame for eyeglasses, which mounts at least one nosepiece according to claim 1.

\* \* \* \* \*